United States Patent [19]

Syamoto et al.

[11] Patent Number: 5,294,084
[45] Date of Patent: Mar. 15, 1994

[54] HOLDING DEVICE FOR A CONNECTOR ASSOCIATED WITH AN ELECTRICALLY CONTROLLED AUTOMOTIVE MIRROR

[75] Inventors: Noriyasu Syamoto; Masaki Fujita, both of Aichi, Japan

[73] Assignee: Kabushiki Kaisha Tokai Rika Denki Seisakusho, Aichi, Japan

[21] Appl. No.: 63,559

[22] Filed: Jun. 29, 1993

Related U.S. Application Data

[63] Continuation of Ser. No. 735,887, Jul. 25, 1991, Pat. No. 5,238,214.

[30] Foreign Application Priority Data

Jul. 26, 1990 [JP] Japan ................................ 2-79546[U]
Sep. 25, 1990 [JP] Japan ............................... 2-100464[U]

[51] Int. Cl.⁵ ............................................. G02B 7/18
[52] U.S. Cl. .................................... 248/544; 248/479; 359/877
[58] Field of Search ............... 248/476, 487, 544, 479, 248/475.1; 359/877

[56] References Cited

U.S. PATENT DOCUMENTS

| | | | |
|---|---|---|---|
| 4,681,409 | 7/1987 | Enomoto | 359/877 |
| 4,930,370 | 6/1990 | Yoshida | 359/877 |
| 4,973,147 | 11/1990 | Fujita et al. | 359/877 |

*Primary Examiner*—Alvin C. Chin-Shue
*Attorney, Agent, or Firm*—Finnegan, Henderson, Farabow, Garrett & Dunner

[57] ABSTRACT

A holding device for a connector associated with an electrically controlled automotive mirror is provided such that the connector becomes fixed to a mirror unit by a cylindrical portion integrally formed in a bracket mounted to a side of a housing adapted for connection to an automotive vehicle body. Due to the provision of the cylindrical portion, the connector can be fixed to the mirror unit in a simple manner. With the connector being fixed to the mirror unit, connections between the connector and a mated connector provided in automotive vehicle body may be made in a much easier fashion.

5 Claims, 2 Drawing Sheets

HOLDING DEVICE FOR A CONNECTOR ASSOCIATED WITH AN ELECTRICALLY CONTROLLED AUTOMOTIVE MIRROR

This is a continuation of application Ser. No. 07/735,887, filed Jul. 25, 1991, U.S. Pat. No. 5,238,214 issued Aug. 24, 1993,

BACKGROUND OF THE INVENTION

1. Field of the Invention

The present invention relates to a holding device for a connector associated with an electrically controlled automotive mirror, and more particularly, to a device for fixing a connector to a portion of a mirror unit, wherein the connector is provided at an end of the wiring extending from an electrical driving device for controlling the automotive mirror.

2. Description of the Prior Art

An electrically controlled automotive mirror is generally provided with a connector at one end of the wiring extending from an electrically driving device used to position the automotive mirror. The connector is designed to be connected to another mated connector provided on a main harness provided in the body of an automotive vehicle.

If the mirror is to be mounted on the body of the vehicle, it is necessary to connect the connectors to each other in advance. Typically, a worker must use both hands for connecting the connectors together, while holding the mirror unit under his arm. This method tends to decrease working efficiency.

To cope with the above difficulty, the Japanese Unexamined Utility Model Publication No. Hei. 2-48450 discloses an automotive mirror unit including a housing for housing an electrically driving device, a mirror base onto which the housing is mounted and a connector provided at one end of a wiring extending from the electrically driving device, the connector being held onto the mirror base.

In the disclosed mirror unit, the connector is inserted into and fitted to an opening formed in the mirror base, and securely fixed to the mirror base by means of screws.

With this arrangement, if the mirror unit is to be mounted onto an automotive vehicle body, a worker can grasp the mirror unit with one hand and a mated connector provided in the automotive vehicle body with the other hand, and directly connect two connectors together.

The disclosed arrangement, however, suffers from the following problems:

In order to fix the connector to the mirror base by means of the screws, it is necessary not only to form holes for the screws on the mirror base, but also to form projecting pieces having holes for the screws on the connector to be fixed.

Accordingly, the generally or already used connector cannot be used for the disclosed arrangement, and therefore, the specific connector having the projecting pieces formed with the holes is required for the arrangement.

OBJECT OF THE INVENTION

It is, therefore, an object of the present invention to provide a holding device for a connector associated with an electrically controlled automotive mirror, in which the connector can be connected to another mated connector with the use of only one hand, thereby improving working efficiency.

Another object of the present invention is to provide a holding device for a connector associated with an electrically controlled automotive mirror, in which the connector can be held and retained in place with a simple arrangement.

Yet another object of the present invention is to provide a holding device for a connector associated with an electrically controlled automotive mirror, in which the connector is not required to have specific form or arrangement different from the connector conventionally used in the automotive mirror.

SUMMARY OF THE INVENTION

In order to attain the above-noted and other objects, a holding device for a connector associated with an electrically controlled automotive mirror is provided. The connector is adapted for connection to a mated connector provided in an automotive vehicle body. The holding device comprises a mirror unit, adapted for connection to an automotive vehicle body, including a mirror, an electrically driving device for driving the mirror, and a housing for housing the mirror and the electrically driving device. A member is provided and adapted to be mounted to a side of the housing adapted for connection to the automotive vehicle body. The member is integrally formed with a cylindrical portion. A connector is provided at an end of a wiring extending from the electrical driving device. The connector is adapted for insertion into and to be held by an inner surface of the cylindrical portion.

The member is preferably a bracket fixed to the side of the housing adapted for connection to the automotive vehicle body, or a stay rotatably mounted to the side of the housing through a shaft. The holding device preferably includes a sealing member adapted to be disposed between the inner surface of the cylindrical portion and an outer surface of the connector. The holding device preferably includes a holder adapted to be fixed to the member and to be engaged with an upper peripheral end of the connector for securing the connector to the member.

BRIEF DESCRIPTION OF THE DRAWINGS

The accompanying drawings, which are incorporated in and constitute a part of the specification, illustrate the presently preferred embodiments of the invention and, together with the general description given above and the detail description of the preferred embodiments given below, serve to explain the principles of the invention.

DETAILED DESCRIPTION OF THE PREFERRED EMBODIMENTS

Preferred embodiments of the present invention are hereinafter described in detail with reference to the accompanying drawings.

Figure 1:
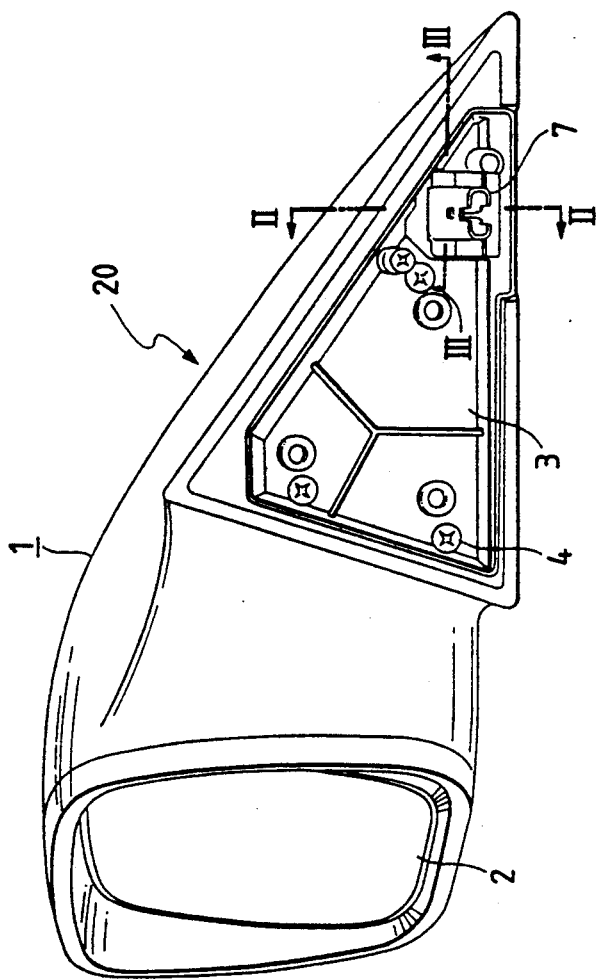
FIG. 1 depicts a side view of a first embodiment of the invention.
Figure 3:
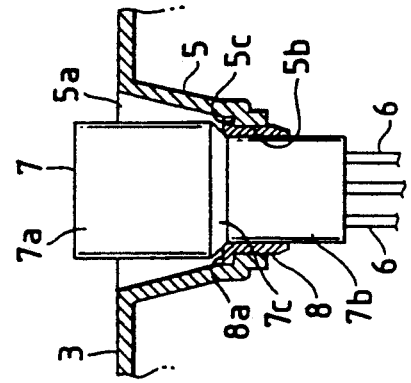
FIG. 3 is a cross sectional view along III—III line in FIG. 1.
Figure 2:
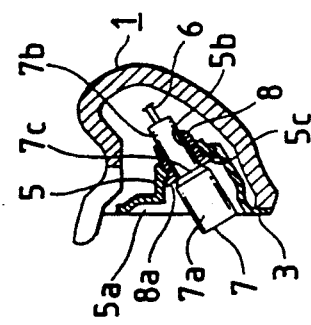
FIG. 2 is a cross sectional view along the II—II line in FIG. 1.

FIGS. 1, 2 and 3 depict a first embodiment of the present invention, wherein a mirror unit 20 includes a housing 1, preferably made of plastic, and a conventional electrically driving device (not shown) for driving a mirror 2 up and down and right and left, the electrically driving device being installed within the housing 1. A bracket 3 is provided on a side of the housing 1, whereby the housing 1 is to be mounted onto an automotive vehicle body. The bracket 3 is made by a zinc die casting, for example, and fixed to the housing 1 by a plurality of screws 4. The bracket 3 is formed integrally with a cylindrical portion 5 such that the cylindrical portion projects therefrom and directs inwardly of the housing 1. The cylindrical portion 5 includes a wide end 5a and a narrow end 5b so as to form a step portion 5c on an inner cylindrical wall of the cylindrical portion 5 near the narrow end 5b.

A connector 7 is provided at tip ends of wiring 6 extending from the electrically driving device installed in the housing 1. The connector 7 is preferably made of plastic, and includes a main portion 7a for housing terminals (not shown) connected to conductors of the wiring 6, and a holding portion 7b for retaining and holding the wiring 6. The connector 7 has such a rectangular cylindrical shape that the wide main portion 7a and the narrow holding portion 7b adjoin each other through a slope portion 7c. A rubber sealing member 8 having a rectangular cylindrical or frame-like shape, is formed with a flange 8a projecting outwardly from one end thereof. The sealing member 8 is adapted to be fitted to the holding portion 7b of the connector 7 such that the flange 8a side is opposed to the slope portion 7c. The connector 7 with the sealing member 8 fitted therearound, is inserted into the cylindrical portion 5 from the wide open end 5a side of the cylindrical portion 5 so that the holding portion 7b of the connector 7 is held and retained in place on the inner wall of the cylindrical portion 5 through the sealing member 8. In advance of the insertion of the connector 7 into the cylindrical portion 5, the wiring 6 having the connector 7 at its one end is inserted into the cylindrical portion 5 from the wide open end 5a side of the cylindrical portion 5.

When the connector 7 is inserted into the cylindrical portion 5 so that the holding portion 7b is held though the sealing member 8 onto the narrow open end 5b, the slope 5c of the connector 7 depresses the flange 8b of the sealing member 8 against the step portion 5c of the cylindrical portion 5. With the elastic characteristic of the sealing member 8, it is possible not only to attain the sealing or water proof property between the connector 7 and the cylindrical portion 5, but also to hold the connector 7 in position onto the cylindrical portion 5.

With the connector 7 fitted to and held by the cylindrical portion 5 of the bracket 3, a worker can grasp the mirror unit 20 with one hand and a mated connector provided in an automotive vehicle body with the other hand, and directly connect the two connectors together. This arrangement for connecting connectors together is far superior and far more efficient than prior arrangement, in which a worker needed both hands to connect the connectors and had to use some other means to support the mirror unit. Further, it is easier to hold the connector 7 onto the bracket 3 since the connector 7 is merely inserted into the cylindrical portion 5 from the wide open end 5a side of the cylindrical portion 5, so that working efficiency can be improved. Furthermore, with the provision of the sealing member 8 interposed between the connector 7 and the cylindrical portion 8, the water proof property therebetween can be improved.

FIGS. 4-7 depict a second embodiment of the present invention, wherein a mirror unit 120 includes a stay 102, preferably made by a zinc die casting, and a housing 104 pivotably supported by the stay 102 through a shaft 103. The mirror unit 120 further includes a conventional electrically driving device (not shown) for driving a mirror 105 up and down and right and left, the electrically driving device being installed within the housing 104.

Figure 6:
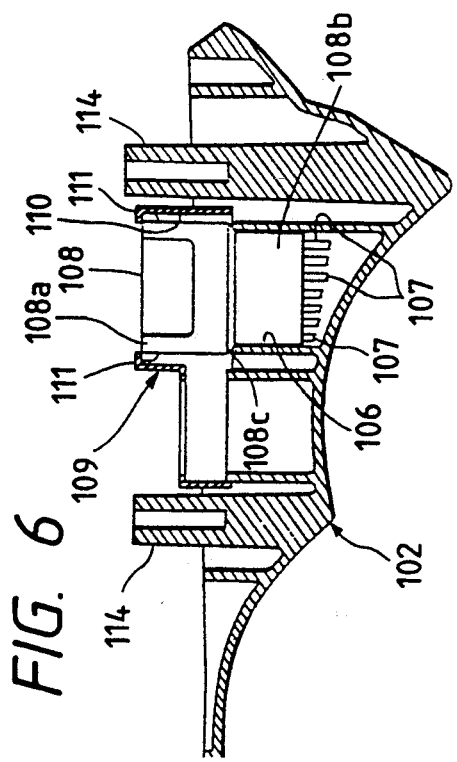
FIG. 6 is a cross sectional view along the line VI—VI in FIG. 4.
Figure 7:
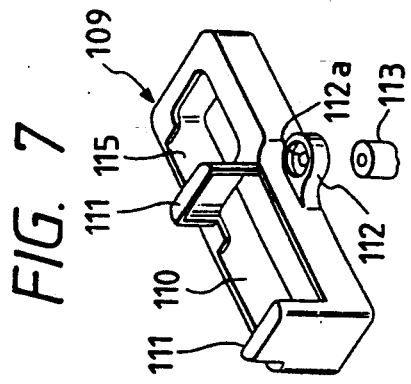
FIG. 7 is a perspective view of a connector holder used in the second embodiment.
Figure 4:
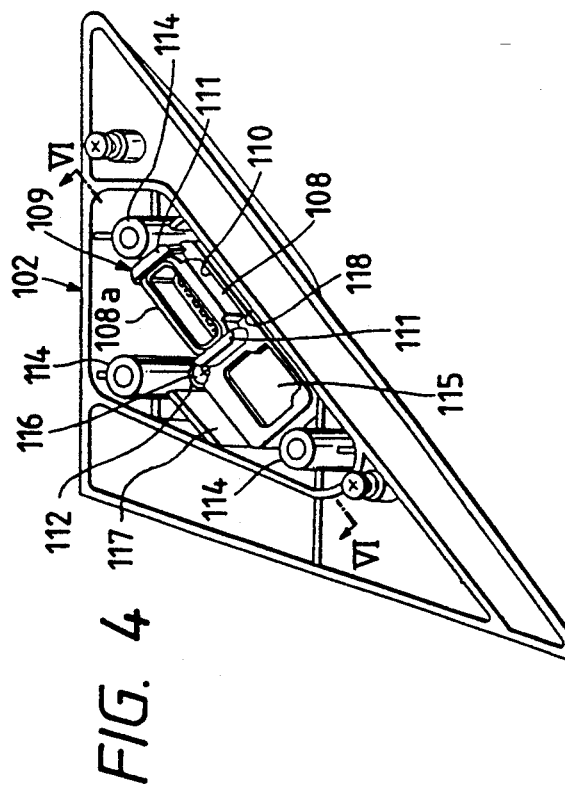
FIG. 4 depicts a perspective view showing a major part of a second embodiment of the invention, viewed from an automotive vehicle body side.
Figure 5:
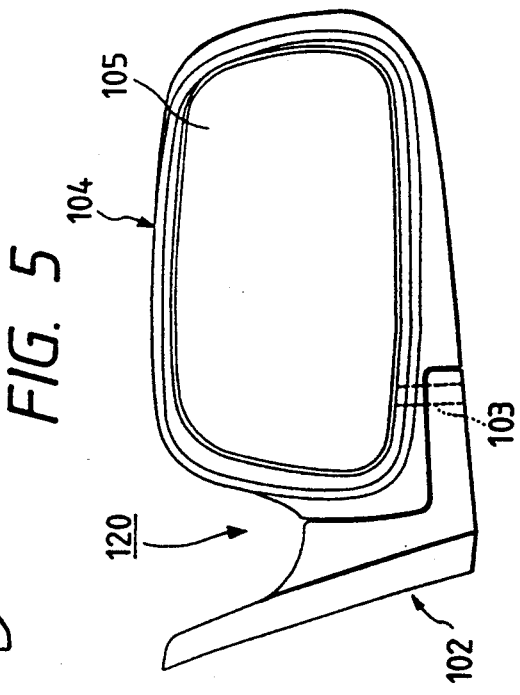
FIG. 5 is a front view of the second embodiment.

As best shown in FIG. 6, the stay 102 is integrally formed with a cylindrical portion 106.

A connector 108 is provided at tip ends of wiring 107 extending from the electrically driving device installed in the housing 104. The connector 108 is preferably made of plastic, and includes a main portion 108a for housing terminals connected to conductors of the wiring 107, and a holding portion 108b for retaining and holding the wiring 107. The connector 108 has such a rectangular, cylindrical shape that the wide main portion 108a and the narrow holding portion 108b adjoin each other through a slope portion 108c.

A connector holder 109 is adapted for fixing the connector 108 to the stay 102. The connector holder 109 is preferably made of plastic, and includes a fitting opening portion 110 to be fitted around an outer peripheral surface of the connector 108, two retaining portions 111, respectively projecting from opposing sides of the opening portion 110, and a mounting piece 112 protruded from a lateral side of the opening portion 110 and formed with a hole 112a for mounting the connector holder 109 onto the stay 102. Each of the retaining portions 111 has a "L" shape in cross section. The connector holder 109 is preferably formed with another fitting opening portion 115 for an additional connector.

In addition, the stay 102 is formed with a connector holder mounting protrusion 113 for mounting the connector holder 109 onto the stay 102, and with three mirror unit mounting protrusions 114 for mounting the mirror unit 120 onto the automotive vehicle body.

In order to fix the connector 108 onto the stay 102, the holding portion of the connector 108 is first inserted into and fitted to the cylindrical portion 106 of the stay 102 so that the slope portion 108c contacts a distal end of the cylindrical portion 106. The connector holder 109 is applied to the connector 108 fitted onto the cylindrical portion 106 such that the fitting opening portion 110 is fitted around the main portion 108a, and then the connector holder 109 is fixed to the stay 102 by threadingly engaging a screw 116, which is inserted into the hole 112a of the mounting piece 112, with the connector holder mounting protrusion 113. With the connector holder 109 fixed to the stay 102, the retaining portions 111 depress upper peripheral ends of the connector 108 and retain the connector 108 in place, to thereby prevent the connector 108 from falling off from the stay 102. In addition, the protrusions 114 and wall portions 117 and 118 prevent the connector holder 109 fixed by the screw 16 from rotatably moving around the screw 116.

With the connector 108 fitted and held onto the stay 102 through the connector holder 109, a worker can grasp the mirror unit 120 with one hand and a mated connector provided in an automotive vehicle body with the other hand, and directly connect the two connectors together. This arrangement for connecting connectors together is far superior and far more efficient than prior arrangement, in which a worker needed both hands to connect the connectors and had to use some other means to support the mirror unit. Further, due to the provision of the connector holder, the connector is not required to have specific form or arrangement different from the connector already used in the electrically controlled automotive mirror, thereby reducing a manufacturing cost. Furthermore, due to the provision of the other opening portions for the additional connectors, the present invention is applicable to an automotive mirror having various functions.

Additional advantages and modification will readily occur to those skilled in the art. Therefore, the invention in its broader aspects is not limited to the specific details, representative devices, and illustrative examples shown and described. Accordingly, departures may be made from such scope of the general invention concept as defined by the appended claims and their equivalents.

What is claimed is:

1. A holding device for a connector associated with an electrically controlled automotive mirror, the connector being adapted for connection to a mated connector provided in an automotive vehicle body, the device comprising:
    a mirror unit, adapted for connection to an automotive vehicle body, including a mirror, an electrical driving device for driving the mirror, and a housing for housing the mirror and the electrical driving device;
    a member adapted to be mounted to a side of the housing adapted for connection to the automotive vehicle body, the member being integrally formed with a cylindrical portion;
    a connector provided at an end of a wiring extending from the electrical driving device, the connector being adapted for insertion into and to be held by an inner surface of the cylindrical portion; and
    a sealing member adapted to be disposed between the inner surface of the cylindrical portion and an outer surface of the connector.

2. The device according to claim 1, wherein the member is a bracket fixed to the side of the housing adapted for connection to the automotive vehicle body.

3. The device according to claim 1, wherein the sealing member is composed of an elastomeric material.

4. A mirror unit attachable to a vehicle body, comprising: a housing for supporting a mirror and an electrical driving device for driving the mirror;
    a bracket mounted to a side of the housing for connecting the housing to the vehicle body, the bracket including a generally cylindrical hollow portion;
    a connector for connecting wiring associated with the electrical driving device to a mated connector provided in the vehicle body, the connector insertable into the generally cylindrical hollow portion of the bracket; and
    a sealing member disposed between an inner surface of the generally cylindrical hollow portion and an outer surface of the connector for supporting the connector in the cylindrical portion.

5. The mirror unit of claim 4, wherein the inner surface of the cylindrical portion includes an inwardly projected ridge and the sealing member includes a flange supportable by the ridge of the cylindrical portion.

* * * * *